W. H. Campbell,
Cage Trap.
No. 56,175. Patented July 10, 1866.
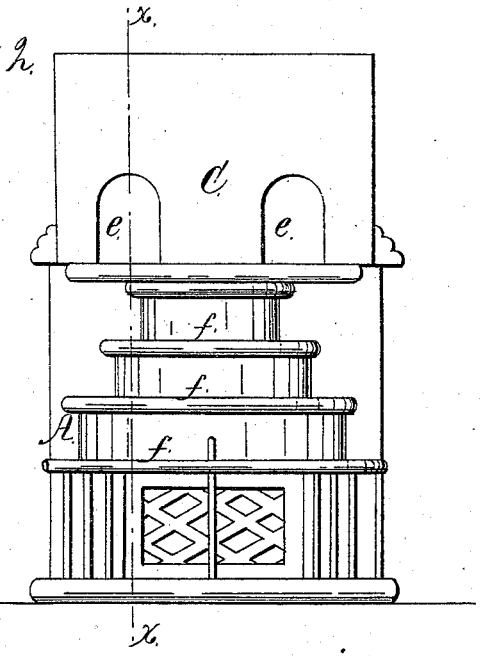
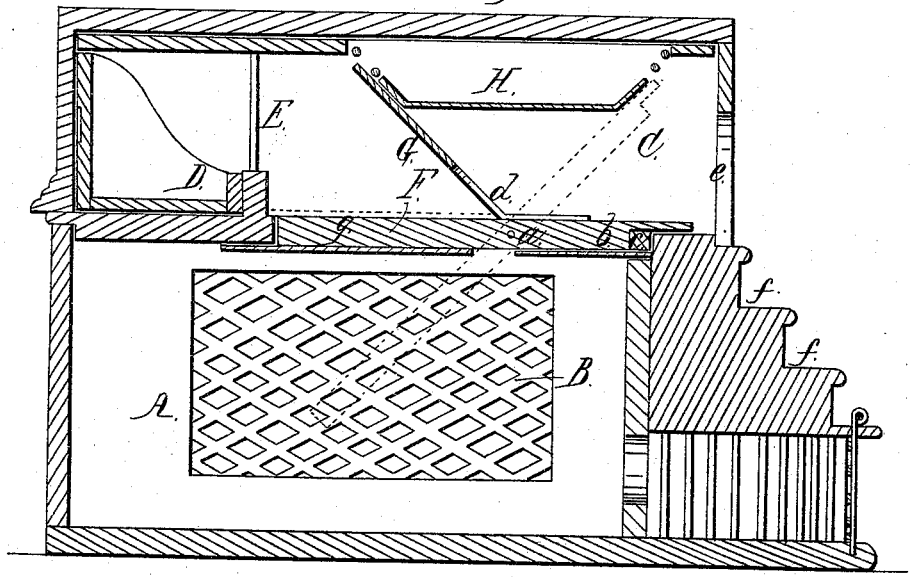

UNITED STATES PATENT OFFICE.

WM. HENRY CAMPBELL, OF BROOKLYN, NEW YORK.

IMPROVEMENT IN ANIMAL-TRAPS.

Specification forming part of Letters Patent No. 56,175, dated July 10, 1866.

*To all whom it may concern:*

Be it known that I, WILLIAM HENRY CAMPBELL, of Brooklyn, Kings county, State of New York, have invented a new and Improved Rat and Mouse Trap; and I do hereby declare that the following is a full, clear, and exact description thereof, which will enable others skilled in the art to make and use the same, reference being had to the accompanying drawings, forming part of this specification, in which—

Figure 1 is a longitudinal vertical section of my invention; Fig. 2, a front elevation of the same.

Similar letters of reference indicate like parts.

This invention relates to a new and improved self-setting rat and mouse trap; and it consists in the employment or use of an apartment provided with one or more pivoted platforms arranged with inclined guards and a bait-drawer and placed over a box or receptacle into which the animals are precipitated, all being arranged as hereinafter set forth, whereby a very simple and economical trap for the purpose specified is obtained.

A represents a box, which may be of any suitable dimensions and provided at each side with an opening covered by a wire or metal grating, B. On the top of this box A there is placed a smaller box, C, in one end of which there is inserted a drawer, D, into which the bait is placed, and a wire partition, E, separating the drawer from the other portion of the box. (See Fig. 1.)

In the bottom of the box C there are placed one or more platforms F, (the drawings represent a trap for two platforms,) which are hung on pivots a, and are retained, when there is no weight upon them, in a closed horizontal state by their superior gravity at one side, b, of the pivots a. To effect this a weight, c, may be attached to that part of the platforms.

To the upper surface of each platform F there is attached an oblique guard, G, at an angle of about forty-five degrees. These guards have openings d made in them for the rats or mice to pass through, and in the upper part of the box C there is placed a horizontal plate, H, turned up at each end, so as to have an inclination of about forty-five degrees, and serve as bearings or stops, one end for the guards G and the other for the platforms F. At the front end of the box C there are two openings, e e, through which the rats or mice pass into said box, steps f being made at the front end of A to facilitate their entrance into C.

The rats or mice, attracted by the bait in the drawer H, ascend the steps f and pass through the openings e into box C, and thence over the parts b of the platforms through the openings d in the guards and on the parts g of the platforms. The weight of the animal on the part g of the platforms causes the latter to tilt, as indicated by the dotted lines in Fig. 1, and the animal is precipitated into the receptacle A, the guards G preventing the animal from jumping back into the box C.

The parts or sides b of the platforms come in contact with the outer ends of the plates H when the platforms are tilted, said ends of the plates limiting the tilting movement, and the guards G are against the inner ends of the plates D when the platforms are closed or in a horizontal position. As soon as an animal has been precipitated into the receptacle A the platform instantaneously assumes a closed horizontal position by the superior gravity of the part or side b. Thus it will be seen that the trap is self-setting, and as the bait in the drawer H is not accessible it is never consumed, and only requires to be renewed when it becomes stale.

I claim as new and desire to secure by Letters Patent—

The combination, with the pivoted platform F and receptacle A, of the guards G, and plates H, which prevent the rats from making their escape by jumping back after the platform has tilted, as described.

WM. H. CAMPBELL.

Witnesses:
  M. M. LIVINGSTON,
  C. L. E. TOPLIFF.